United States Patent [19]

Röhrig

[11] 4,435,945
[45] Mar. 13, 1984

[54] APPARATUS FOR GIRDING PACKAGE WITH BONDED SYNTHETIC-RESIN STRIP

[75] Inventor: Klaus Röhrig, Wuppertal, Fed. Rep. of Germany

[73] Assignee: Berning & Sohne, Fed. Rep. of Germany

[21] Appl. No.: 276,661

[22] Filed: Jun. 23, 1981

[30] Foreign Application Priority Data

Jun. 24, 1980 [DE] Fed. Rep. of Germany ....... 3023526

[51] Int. Cl.$^3$ ............................................. B65B 13/32
[52] U.S. Cl. ........................................ 53/589; 53/373; 156/502; 156/515; 100/33 PB
[58] Field of Search .......................... 53/582, 589, 373; 100/33 PB; 156/502, 515

[56] References Cited

U.S. PATENT DOCUMENTS

| | | | |
|---|---|---|---|
| 1,650,849 | 11/1927 | McChesney | 53/589 X |
| 3,438,173 | 4/1969 | Omori | 53/373 X |
| 3,494,280 | 2/1970 | Kobiella | 100/33 PB |
| 3,850,780 | 11/1974 | Crawford | 53/373 X |
| 3,851,576 | 0/0000 | Takahashi | 100/33 PB |
| 3,858,503 | 1/1975 | Takahash | 100/33 PB |
| 3,914,153 | 0/0000 | Sato | |
| 4,050,372 | 9/1977 | Kobiella | 100/33 PB |

FOREIGN PATENT DOCUMENTS

1629160 of 0000 Fed. Rep. of Germany .
2532217 of 0000 Fed. Rep. of Germany .
2818325 of 0000 Fed. Rep. of Germany .

Primary Examiner—John Sipos
Attorney, Agent, or Firm—Karl F. Ross; Herbert Dubno

[57] ABSTRACT

In an apparatus for girding packages with endless synthetic-resin strips, an assembly for bonding the ends of a web segment to one another comprises a press in the form of a fixed surface and a spring-loaded press bar shiftably mounted in a rotating truncated drum along a diameter thereof. An outer tangentially extending surface of the bar has a rotation path interrupted by the fixed surface. The drum also carries a blade forming one side of a wedge-shaped channel for guiding a trailing web-segment end during a bonding phase of an operating cycle. Upon the beginning of the bonding phase a leading web portion surrounds the package and traverses the drum channel. The rotation of the drum causes the press bar to clamp the web to the fixed surface, whereupon the blade cuts the web and produces a web segment having a trailing end. A heating mandrel pivoted into a wedge-shaped space between a leading web-segment end and the fixed surface on one side and the trailing web-segment end and the press bar on the other side slips over a surface of the trailing web-segment end and, while being pushed towards a rest position by the rotating press bar. The press bar squeezes the heated segment end to the other end in a sweeping motion.

14 Claims, 14 Drawing Figures

APPARATUS FOR GIRDING PACKAGE WITH BONDED SYNTHETIC-RESIN STRIP

FIELD OF THE INVENTION

My present invention relates to an apparatus for encircling a package with a synthetic-resin strip and for bonding the ends of the strip to one another to form an endless band girding the package.

BACKGROUND OF THE INVENTION

Machines abound for fastening packages with endless plastic belts. Such machines include feeding devices for encircling the packages with web segments and bonding assemblies for heating one or both ends of a web segment and pressing the segment ends together. The technological problems lie in designing the bonding assembly simply enough. Present bonding assemblies are complex, i.e. have many moving parts, and are prone to breakdowns.

OBJECTS OF THE INVENTION

An object of my present invention is to provide an improved package-girding apparatus of the above-mentioned type, which is reliable and less prone to malfunction than conventional package-binding equipment.

Another object of my present invention is to provide such a package-girding apparatus with a simple web-bounding assembly.

SUMMARY OF THE INVENTION

An apparatus for girding a package with a bonded synthetic-resin strip comprises, according to my present invention, a feeder on a frame for automatically encircling the package with a leading portion of an elongate synthetic-resin web, a clamp of the frame for temporarily constraining the web upon an encircling of the package by the web and a cutter at a bonding station for severing the leading web portion upon a securing of the web by the clamp, thereby forming a web segment having a leading end and a trailing end overlappable therewith and engaging the package along at least a substantial part of a perimeter thereof. A support or table is provided at the bonding station for holding the package thereat, while the clamp functions to secure at least one of the ends of the web segment.

A heating element is mounted on the frame in the region of the bonding station and is insertable between the ends of the web segment for heating at least one of the ends on a surface facing the other end. A press is provided on the frame at the bonding station for squeezing the ends of the web segment together along an imaginary surface upon a melting of a web surface by the heating element. The press includes a first press element mounted on the frame for rotation about an axis parallel to the imaginary surface. A second press element is disposed in the rotation path of the first press element for coacting therewith to squeeze the web-segment ends together during a bonding phase of an operating cycle. At least one of the press elements is shiftably mounted for moving away from the other press element during the bonding phase. The press further includes means for ensuring contact of the press elements, such contact-ensuring means acting on at least the shiftably mounted press element for exerting a restoring force thereon to yieldably urge such element towards the other press element during the bonding phase. A programmer is operatively connected to the feeder, the clamp, the cutter, the heating element and the press for controlling and timing the operations of the package-girding apparatus.

According to another feature of my present invention, the imaginary surface is a plane defined by a clamping surface of the second press element. This element is mounted on the frame at a fixed distance from the rotation axis. Preferably, the contact-ensuring means comprises a restoring spring acting on the first press element, this element being shiftably mounted for reciprocation perpendicular to the rotation axis.

According to another feature of my present invention, the first press element is shiftably mounted on a drum which is in turn rotatably mounted on the frame. The programmer includes a drive shaft substantially coaxial with the rotation axis and connected to the drum for rotating the same.

According to further features of my present invention, the first press element is in the form of a bar shiftably mounted along a diameter of the drum, while the same is truncated along a longitudinal plane extending parallel to the rotation axis and at an angle with respect to the bar. The cutter is a blade in the form of a plate attached to the drum at the longitudinal plane.

The drum is advantageously provided with a channel extending substantially parallel to the press bar for guiding the web during a web-feed phase of the operating cycle of the package-girding apparatus and for guiding the trailing end of the web segment during at least a portion of the bonding phase. The channel is preferably wedge-shaped and defined in part by the blade, the same having a cutting edge disposed on a side of the channel substantially opposite the press bar.

Pursuant to further features of my present invention, the press bar projects a predetermined distance from the drum to ensure a gripping of the trailing web-segment end between the press bar and the clamping surface prior to the severing of the segment from the main body of the web, while the distance between the blade's cutting edge and an outer surface of the press bar is substantially equal to the length of a chord defined by intersections of the clamping surface with a rotation path of the outer end of the bar. The blade's cutting edge coacts with a stationary edge on the frame in order to sever the web segment from the rest of the web; a guide surface is juxtaposed to the stationary edge for forcing the press bar radially inwardly during a passing thereby of the stationary edge during the rotation of the drum.

Pursuant to yet further features of my present invention, the heating element is in the form of a mandrel of small diameter movably mounted on the frame for entering under the control of the programmer a wedge-shaped space between the leading web-segment end and the trailing end upon the severing of the web segment by the blade. During the bonding phase, which ensues upon the severing of the web segment, the trailing web-segment end slips between the mandrel and the bar, the mandrel being pushed towards a rest position by the bar. The mandrel extends parallel to the clamping surface and is pivotably mounted on the frame for swinging about a pivot axis which is perpendicular to the clamping surface and the rotation axis. The pivot axis is preferably located in the region of the package support.

According to another feature of my present invention, the package support is in the form of a platform shiftably mounted on the frame for removing the package from the bonding station upon the completion of an operating cycle. Advantageously, the clamping surface is a surface on the under side of the platform.

The platform, the clamp and the mandrel are operatively connected to the drive shaft during at least a part of the operating cycle, the shaft being provided with cams for at least partially controlling the motions of the platform, the clamp and the mandrel. Generally, the operating cycle corresponds to a revolution of the drive shaft.

The perimeter of the package along which the web segment engages the same defines a plane extending substantially perpendicularly to the clamping surface. The press bar rotates essentially in this plane.

A package-girding apparatus according to my present invention has a web-bonding assembly which is simple in design and execution: the assembly has relatively few moving parts. Such an apparatus is more reliable than conventional devices for girding packages with endless synthetic-resin belts; it is less prone to malfunction. It is more efficient and requires less time and energy to maintain.

Because the essential motion of the bonding assembly is the rotation of the drum, power transmission may be effectuated simply by means of a directly connected shaft. The drum performs the double function of carrying the press bar, on the one hand, and the web-cutting blade, on the other hand. The blade requires no separate actuating mechanism. The blade itself serves to keep the leading and trailing ends of the web segment separated from one another during the bonding phase of the operating cycle, in addition to severing the web segment from the main body of the web. That the blade forms one side of the web-guiding channel in the drum simplifies the construction of the channel.

The proximity of the heating mandrel to the pressure surface of the press bar during the bonding phase is especially advantageous in that excessive cooling of the heated web surface is unlikely. In addition, dirt particles are unlikely to adhere to the heated surface prior to bonding with the corresponding surface of the other web-segment end. These two considerations mean that the plastic welds formed with an apparatus according to my present invention are apt to be particularly strong and durable.

BRIEF DESCRIPTION OF THE DRAWING

These and other features and advantages of my present invention will now be described in detail, reference being made to the accompanying drawing in which.

SPECIFIC DESCRIPTION

Figure 1:
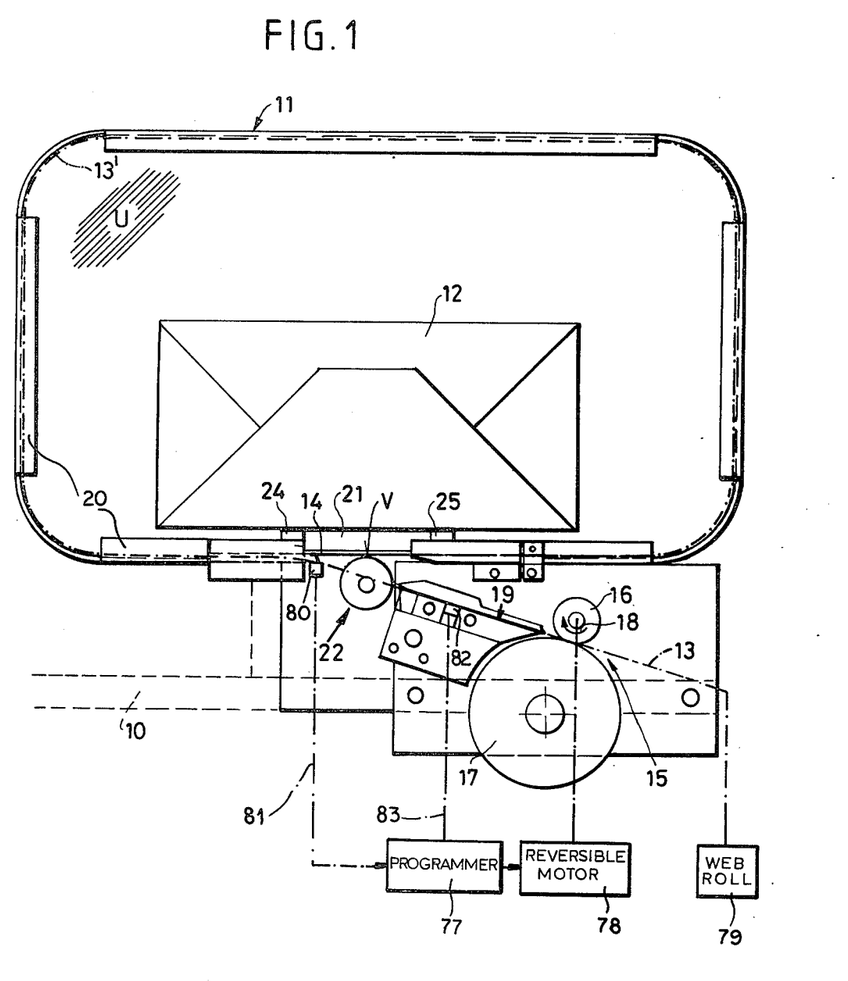
FIG. 1 is a partially schematic side elevational view of an apparatus, according to my present invention, for girding a package with a bonded synthetic-resin strip, showing a bonding assembly.
Figure 2:
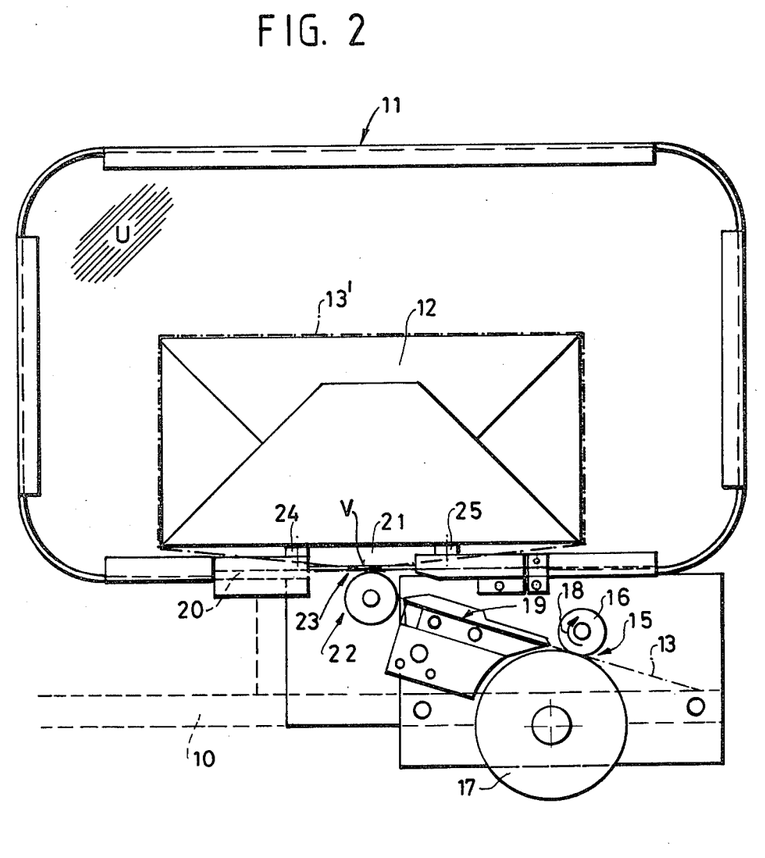
FIG. 2 is a view similar to FIG. 1, showing the apparatus at a later stage in an operating cycle.

As illustrated in FIGS. 1 and 2, an apparatus for girding a package 12 with a bonded synthetic-resin strip or web 13 comprises a rectangularly shaped hoop 11 mounted on a frame 10. The hoop is provided with inwardly facing channels 20 for guiding a leading portion 13' of web 13 during an initial phase of an operating cycle in which a feeder in the form of two opposed rollers 16 and 17 push the leading portion of web 13 through a web guide 19 and past a strip-welding assembly 22 at a bonding station into the channels 20 of hoop 11, whereby the leading web portion 13' surrounds the package 12.

Hoop 11 defines a vertical plane U intersecting package 12 along a perimeter where the package is to be engaged by the leading portion of the web during a strip-withdrawal phase of the operating cycle, as described in detail hereinafter with reference to FIGS. 2 and 5. Package 12 is supported by a table or platform 21 shiftable perpendicularly to plane U through the action of camming surfaces 50 formed on a drive shaft 47 (see FIGS. 4 and 12). Camming surfaces 50 engage a pin 49 projecting downwardly from a lower surface 31 of platform 21 (see FIG. 3). As described more fully hereinafter, lower surface 31 functions as a clamping surface for leading and trailing edges 14 and 52 of web portion 13' (see FIG. 7) and essentially defines an imaginary planar surface V along which leading and trailing web ends 14 and 52 are pressed during a bonding phase of the operating cycle of a package-girding apparatus according to my present invention.

As shown in FIGS. 1–12 platform 21 is guided on frame 10 by a pair of parallel bars or rails 24 and 25.

Figure 3:
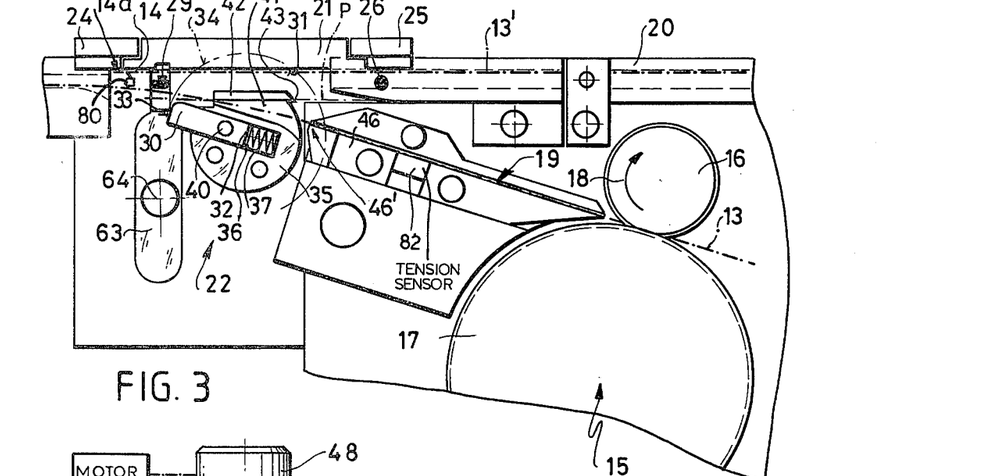
FIG. 3 is a partial side elevational view of the apparatus of FIGS. 1 and 2, showing details of the bonding assembly.

As illustrated in FIG. 3, welding assembly 22 includes a press element 30 in the form of a bar shiftably mounted in a diametrically disposed recess 36 in a carrier drum 35. A restoring spring 37 is also provided in recess 36 for exerting on bar 30 a force tending to push the same radially outwardly.

Figure 4:
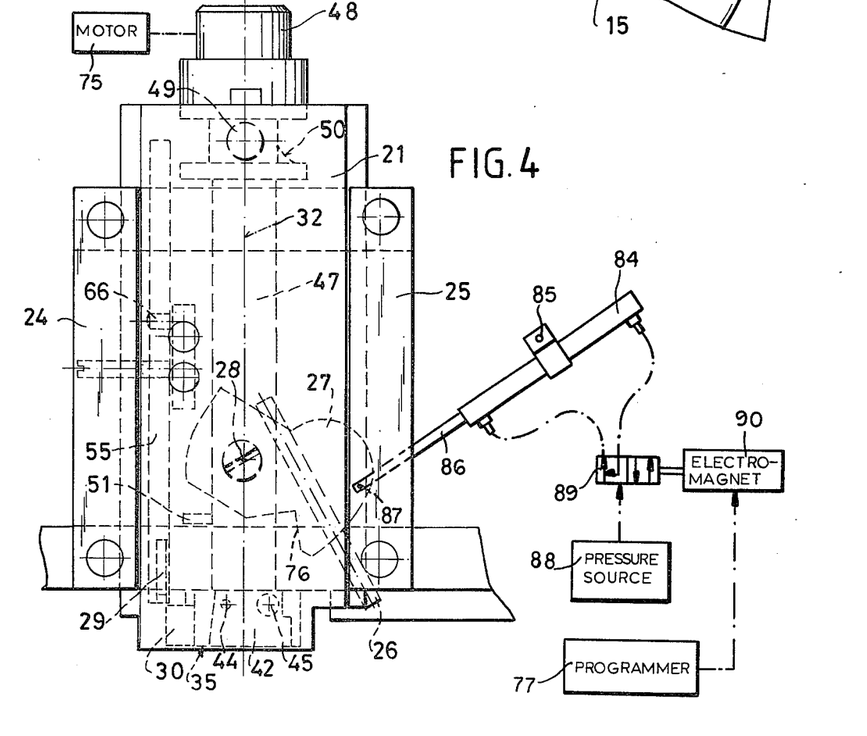
FIG. 4 is a partially schematic top view of a portion of the assembly illustrated in FIG. 3.
Figure 11:
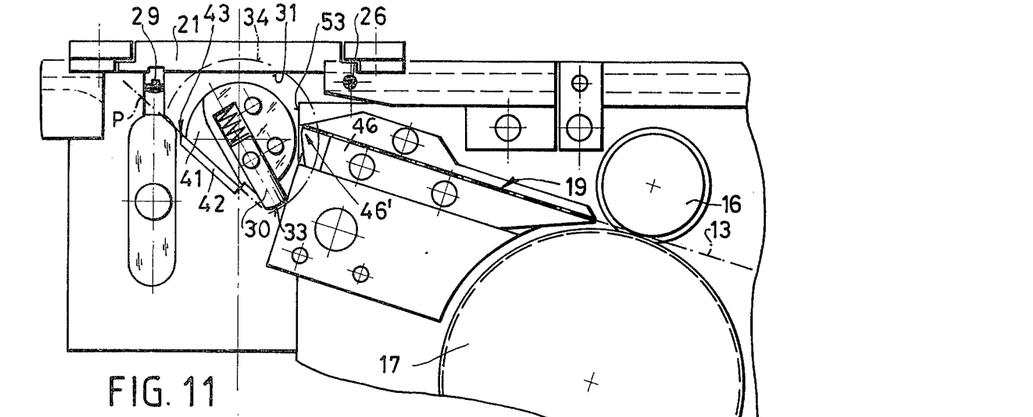
FIG. 11 is a partial side elevational view similar to FIGS. 3, 5, 7 and 9, showing the bonding assembly at an even later stage of an operating cycle.

Drum 35 is truncated along a longitudinal plane (see FIGS. 3 and 11). Plane P extends parallel to an axis of rotation 32 of drum 35 (see FIG. 4) and is oriented at an angle with respect to bar 30. A blade 42 in the form of a plate is attached to drum 35 at longitudinal plane P by means of a bolt 45 and a lug 44 integral with drum 35 (FIG. 4). Blade 42 is attached to drum 35 along a secant thereof and forms one side of a wedge-shaped channel 41 extending in drum 35 substantially parallel to bar 30 for guiding web 13 during the initial loading or package-encircling phase. As shown in FIG. 3, channel 41 has a wide mouth or ingress which faces web guide 19 upon the start of an operating cycle, thereby facilitating the reception of a leading edge 14a of web 13.

Figure 5:
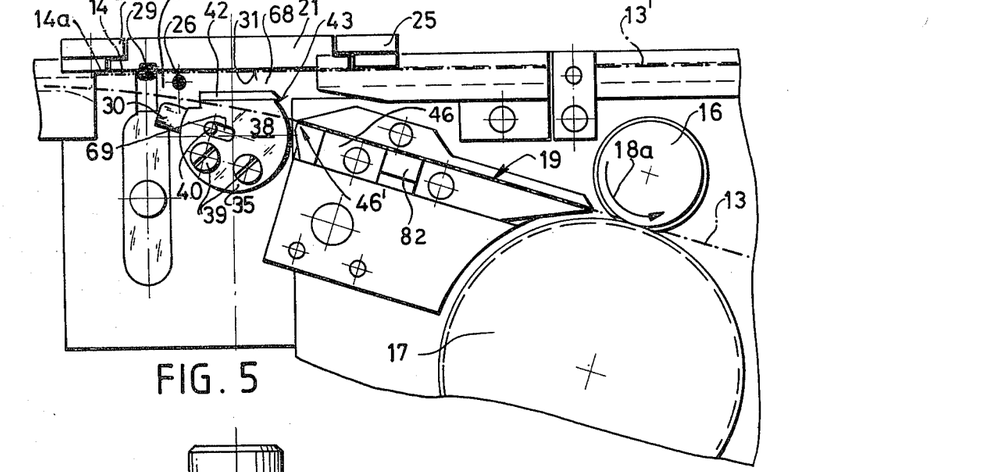
FIG. 5 is a partial side elevational view similar to FIG. 3, showing the bonding assembly at a subsequent stage of an operating cycle.

As illustrated in FIG. 5, an outer side of channel 41 is formed by a cover plate 38 attached to drum 35 by means of a pair of bolts 39. Cover plate 38 is provided with a slot 69 oriented along a diameter of the plate. The slot is traversed by a projection 40 integral with press bar 30, projection 40 and slot 69 coacting to guide the reciprocating motion of bar 30.

Bar 30 has an outwardly facing surface 33 (FIG. 3) disposed generally tangentially with respect to drum 35 and describing a circular arc 34 owing to the constant rotation of the drum. This rotation is implemented by means of a drive shaft 47, shown in FIG. 4, connected at one end to drum 35 and at an opposite end to a rotary-power source 75 via a shaft extension 48. Shaft 47 rotates at a uniform speed, one revolution of the shaft corresponding to a single operating cycle of a package-girding machine according to my present invention.

The circular rotation path 34 of outer surface 33 is interrupted by platform 21. This disposition of platform 21 in the rotation path of bar 30 necessitates the inward shifting of the bar against the force exerted by restoring spring 37. Spring 37 presses bar 30 against clamping surface 31 during a web-bonding phase of an operating cycle, while simultaneously enabling bar 30 to yield to the pressure exerted by the clamping surface.

During a web-bonding phase the leading and trailing ends 14 and 52 of a web segment 13 are pressed between clamping surface 31 and outer surface 33. The pressure is not produced simultaneously along the entire bonded lengths of the web ends. Instead the pressure zone moves from left to right in FIGS. 1-12 along a chord of circular arc 34 defined by the intersection points of the arc and clamping surface 31. Restoring spring 37 ensures a continuous application of force to the web ends during the bonding phase of an operating cycle.

As illustrated in FIG. 4, a package-girding apparatus according to my present invention is provided with a heating mandrel 26 of small diameter fixed to a carrier 27. This carrier is mounted on frame 10 for pivoting about an axis 28 extending perpendicularly to the axis 32 of rotation of shaft 47 and drum 35 and intersecting clamping surface 31. The carrier is formed with a notch 76 which coacts with a lug 51 projecting from shaft 47 to return mandrel 26 at the end of an operating cycle to a rest position shown in FIG. 4.

At the beginning of an operating cycle package 12 is seated on platform 21, the platform having been shifted forward (see FIG. 4) through vertical plane U owing to the coaction of pin 49 and camming curves or surfaces 50. In response to control signals from a programmer 77 (FIG. 1), a rotary-power source 78 operatively connected to roller 16 causes the same to rotate in the sense indicated by an arrow 18, whereby web 13 is drawn from a web roll 79 through a mouth 15 of feeder 16, 17. The web is pushed through guide 19 and channel 41, as indicated in FIG. 3, and encircles package 12 at a distance determined by the dimensions of hoop 11, as indicated in FIG. 1.

As shown in FIGS. 1 and 3, a microswitch 80 is provided at the bonding station for detecting the completed encircling of package 12 by the leading portion 13' of web 13. Upon an actuation of switch 80 by leading web edge 14a, the microswitch emits a signal to programmer 77 via a lead 81. The programmer then actuates a clamping bar 29 (FIGS. 3 and 5) to shift upwardly and thereby coact with clamping surface 31 to grip the leading end 14 of web 13. In response to the signal from the microswitch, programmer 77 also reverses via motor 78 the direction of rotation of roller 16 so that the same begins to turn counterclockwise as indicated by an arrow 18a in FIG. 5. The reversal of the rotation sense of roller 16 and of the opposing counterroller 17 induce the withdrawal of web 13 from hoop 11. Upon the engagement of web segment 13' with package 12 along a perimeter thereof (see FIG. 2), a tension sensor 82 mounted on web guide 19 (FIGS. 1, 3 and 5) generates on a lead 83 extending to programmer 77 a signal informing the same that web segment 13' has engaged the surface of package 12. Programmer 77 then controls motor 78 to terminate the rotation of rollers 16 and 17. The engagement of web segment 13' with the outer surface of package 12 could alternatively be implemented via a load sensor disposed at the output of motor 78.

As indicated by the relative orientations of press bar 30 in FIGS. 3 and 5, the rotation rate of drum 35 is small compared to the rotation rate of roller 16 during the operation thereof by motor 78 (FIG. 1) under the control of programmer 77. Drum 35 rotates through but a small angle during a package-encircling phase consisting of the feeding of web 13 to hoop 11 and the subsequent partial withdrawal of the web to effectuate the engagement of web segment 13' with the surface of package 12.

Figure 6:
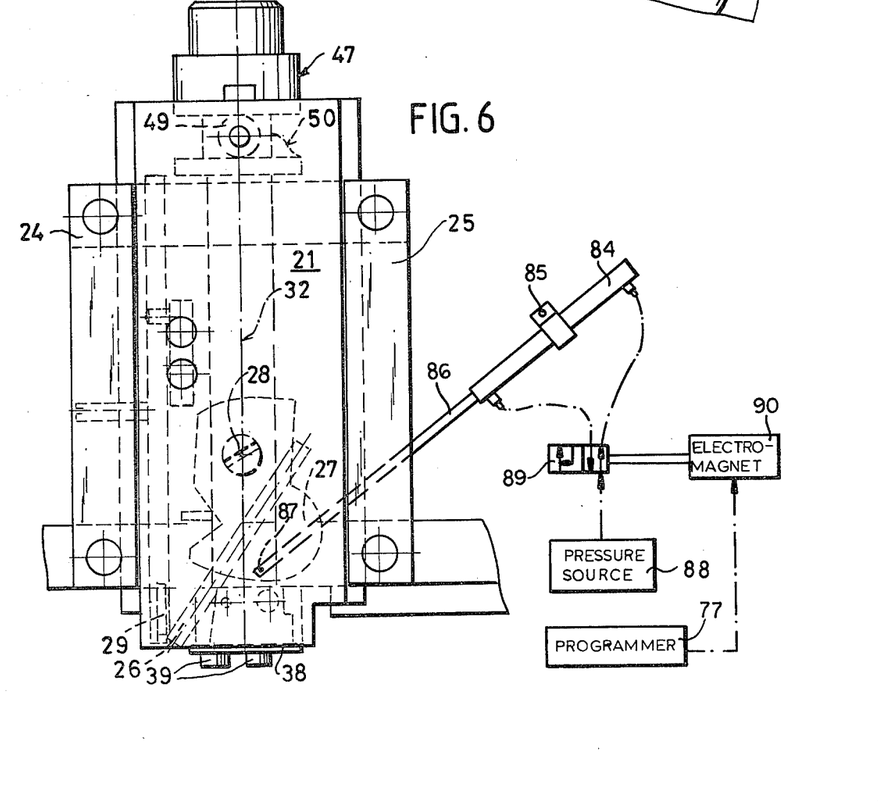
FIG. 6 is a partial top view of the apparatus shown in FIG. 5.

As illustrated in FIGS. 4 and 6, a pneumatic cylinder 84 pivotably attached to frame 10 at 85 has a plunger 86 whose outer end is swingably secured to carrier 27 by means of a pivot 87. Cylinder 84 is chargeable by a pressure source 88 via a valve 89. This valve is operated by an electromagnet 90 in response to signals emitted by programmer 77.

Figure 7:
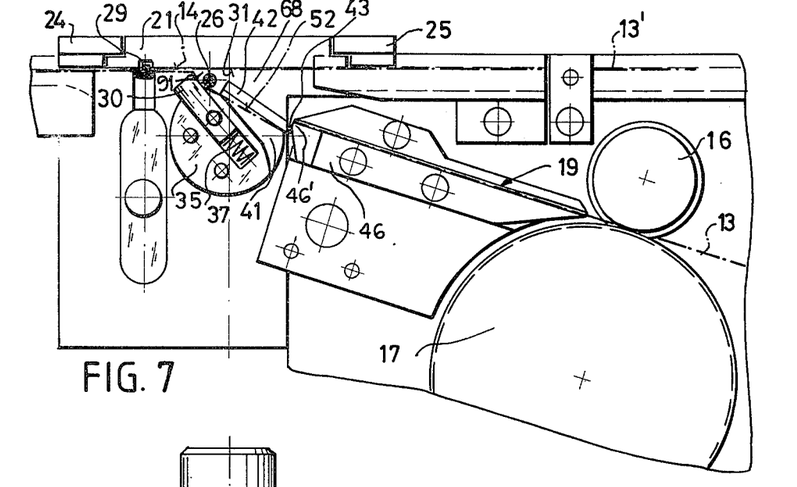
FIG. 7 is a partial side elevational view similar to FIGS. 3 and 5, showing the bonding assembly at yet a later stage of an operating cycle.
Figure 8:
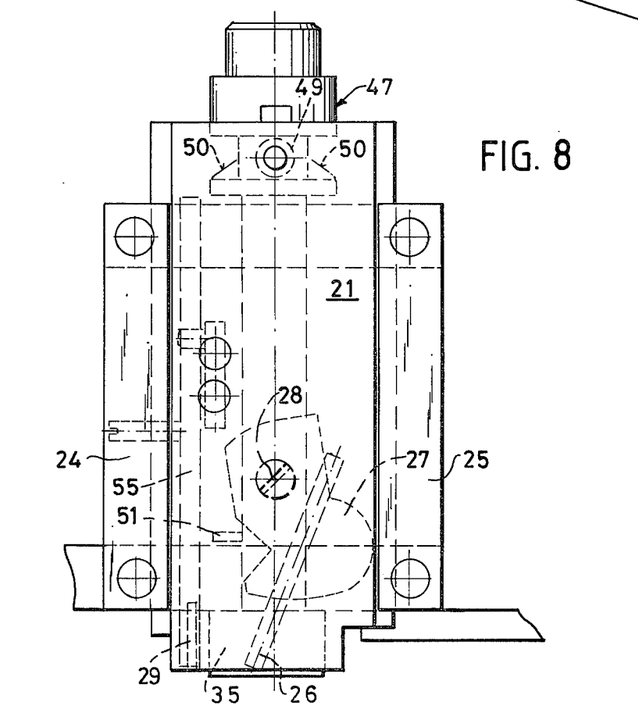
FIG. 8 is a partial top view corresponding to the operating stage illustrated in FIG. 7.

Prior to the arrest of rollers 16 and 17 at the end of the package-encircling phase plunger 86 is in a withdrawn state shown in FIG. 4, both chambers of cylinder 84 communicating with the atmosphere via valve 89. Upon the arrest of rollers 16 and 17 programmer 77 energizes electromagnet 90 to shift valve 89, thereby connecting a rear chamber of cylinder 84 to pressure source 88. The consequent extension of plunger 86 pivots carrier 27 and heating mandrel 26 about rotation axis 28, mandrel 26 entering a wedge-shaped space 91 defined by leading web end 14 and clamping surface 31 on an upper side and by trailing web end 52 and press bar 30 on a lower side, as best shown in FIG. 7. Upon the extension of plunger 86, programmer 77 de-energizes electromagnet 90, thereby opening the chambers of cylinder 84 to the atmosphere. There being no restoring force on plunger 86, it remains extended.

As shown in FIG. 7, blade 42 is provided with a cutting edge 43 on a side of channel 41 substantially opposite press bar 30. The rotation of drum 35 brings edge 43 into juxtaposition with a lip or edge 46' or a lower member of web guide 19. The coaction of edge 43 and lip 46' results in a slicing of the leading portion 13' of web 13 to form a web segment with leading and trailing ends 14 and 52. Immediately prior to or simultaneously with the severing of web 13 by blade 42, outer surface 33 of bar 30 forms a pressure contact with clamping surface 31 through leading and trailing web ends 14 and 52. Thus while the leading end of web segment 13' is secured to clamping surface 31 by clamping bar 29, the trailing end of the web segment is clamped by the coaction of press bar 30 and surface 31. Press bar 30 serves the dual functions of clamping the trailing web end and pressing the two ends together upon heating of the inner or upper surface of trailing end 52 by mandrel 26, as described hereinafter.

Figure 9:
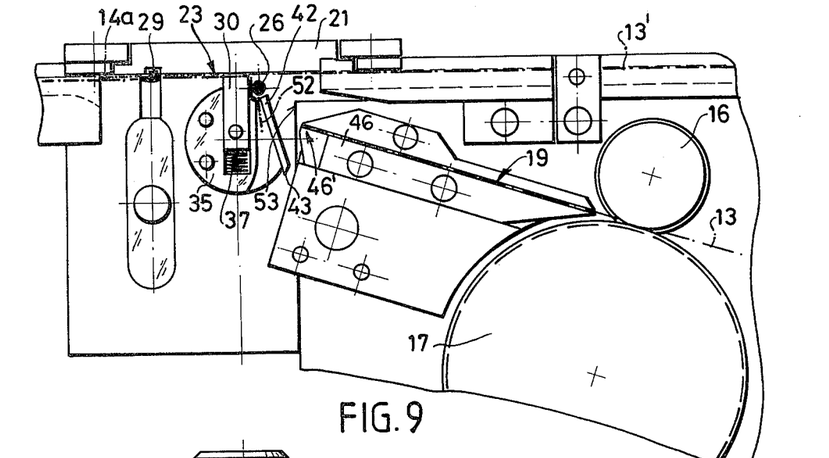
FIG. 9 is a partial side elevational view similar to FIGS. 3, 5 and 7, showing the bonding assembly at an even later stage of an operating cycle.
Figure 10:
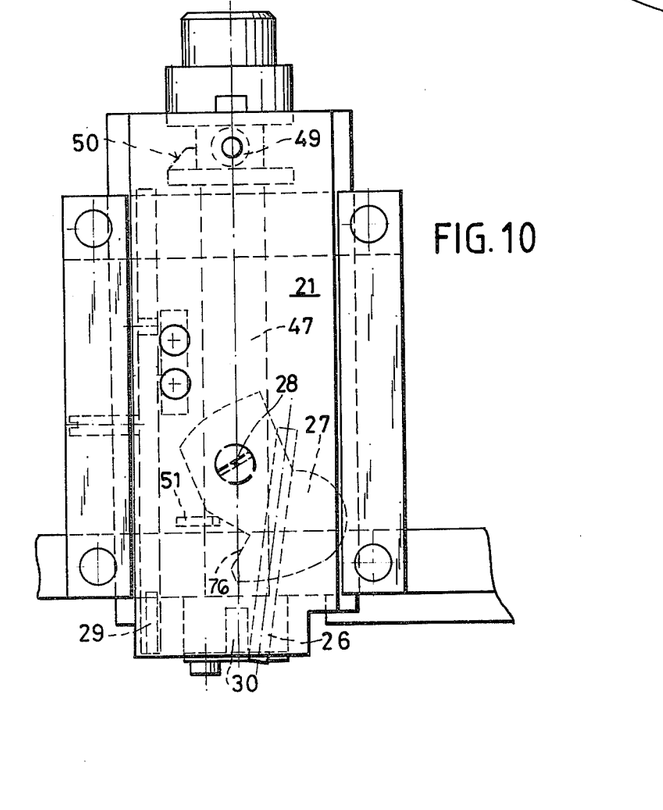
FIG. 10 is a top view similar to FIGS. 4, 6 and 8, showing the bonding assembly at the operating stage shown in FIG. 9.

As shown in FIGS. 7 and 9, during a bonding phase of an operating cycle trailing web end 52 traverses channel 41 and slips between a lateral surface of press bar 30 and heating mandrel 26. Mandrel moves only under the action of bar 30 and is carried thereby in pivotal motion 92 about rotation axis 28 (see FIG. 10). The rotation of drum 35 together with a rotational inertia of mandrel 26 and carrier 27 ensure a continued contact between the mandrel and the upper surface of trailing end 52 during a traversal by outer bar surface 33 of the chord defined by the intersection of circular rotation path 34 and clamping surface 31.

Immediately upon the heating of a section of trailing end 52 by mandrel 26, bar 30 presses the heated section against a corresponding area of leading web end 14. It is advantageous that the sealing pressure is applied sequentially to successive portions of the web ends rather than to the same in their entirety: the sweeping motion has the effect of cleaning the bonding surfaces of foreign matter, thereby increasing the strength of the resulting weld 23 (FIG. 9). This cleansing function is also performed by mandrel 26 during its slippage over the bonding surface of trailing web end 52.

Generally the distance between cutting edge 43 of blade 42 and outer surface 33 of press bar 30 is equal to the length of the chord defined by the intersection of rotation path 34 and clamping surface 31. In this case the section of web 13 extending between surface 33 and edge 43 upon the severing of the web is subsequently bonded to leading end 14. In some applications, however, it may be desirable to leave a final section of trailing end 52 unbonded, e.g. for use as a handgrip to facilitate the breaking of weld 23. To implement this result it is only necessary to increase the distance between edge 43 and surface 33 (in an extended state of bar 30) by, for example, adjusting the position of blade 42 with respect to drum 35.

As illustrated in FIGS. 9 and 11, a guide surface 53 is juxtaposed to blade counterpoint 46 for forcing bar 30 radially inwardly during the rotation of surface 33 past the counterpoint, thereby protecting the same as well as the outer surface of the press bar from undue wear or mutilation.

Upon the completion of the sealing or bonding phase, i.e. upon the disengagement of bar 30 and clamping surface 31, lug 51 engages notch 76 (see FIGS. 10 and 12) to return mandrel 26 to a rest position illustrated in FIG. 4. It is to be noted that the operation of programmer 77 is synchronized with the rotation of shaft 47. To this end a revolution counter (not shown) may be connected to the programmer and juxtaposed to the shaft for monitoring the rotation thereof.

Figure 12:
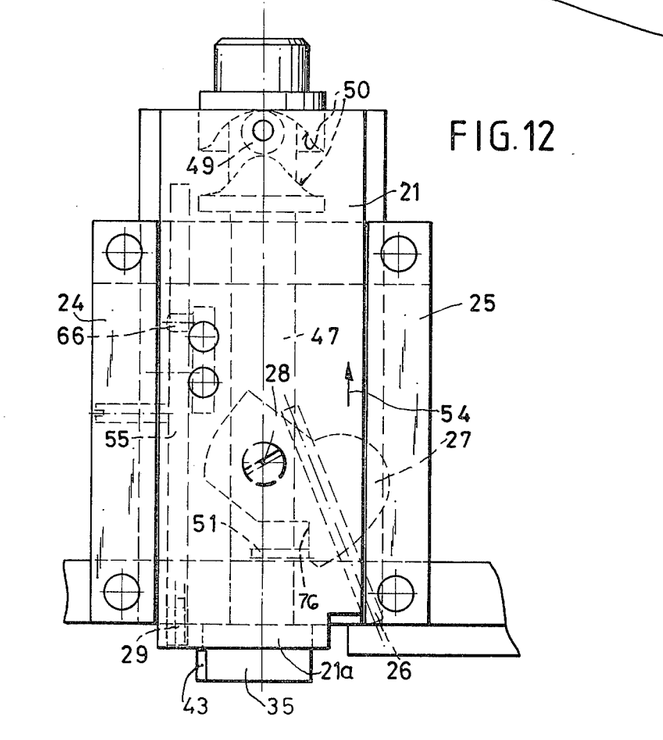
FIG. 12 is a top view similar to FIG. 10, corresponding to the operating stage shown in FIG. 11.

Upon the formation of the thermoplastic weld 23, camming surfaces 50 attached to shaft 47 coact with pin 49 to shift platform 21 out of plane U in the direction of an arrow 54 (FIG. 12). At the same time clamping bar 29 also shifts in the direction marked by arrow 54. The section of web segment 13' containing weld 23 then slips off of surface 31 to engage a lower surface of package 12. The package may subsequently be removed from platform 21 by transfer and conveyance equipment not illustrated in the drawing.

Figure 13:
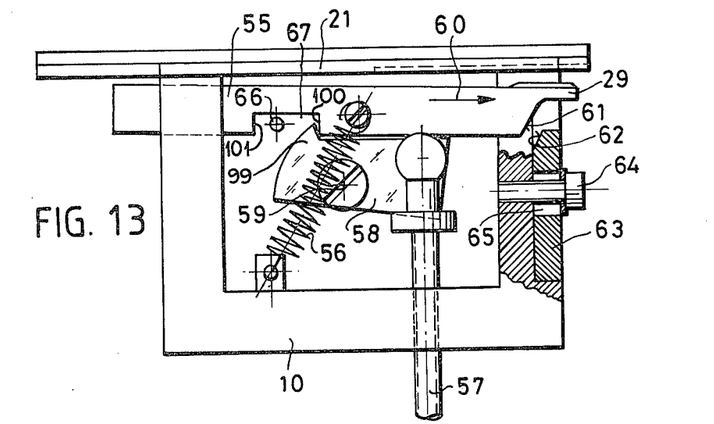
FIG. 13 is a side elevational view of an assembly for controlling the motion of a clamping bar shown in FIGS. 3–12.
Figure 14:
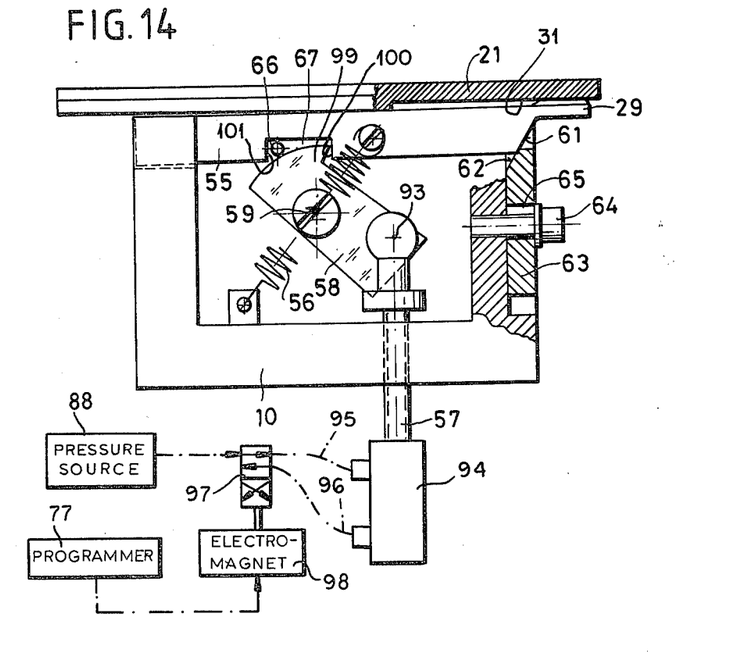
FIG. 14 is a view similar to FIG. 13, showing the motion-control assembly in another phase of operation.

As shown in FIGS. 13 and 14, clamping bar 29 forms an integral part of a lever 55 shiftably and pivotably attached to frame 10. A spring 56 loaded in tension is secured at one end to frame 10 and at an opposite end to lever 55; the spring exerts on lever 55 a restoring force directed at an angle with respect to a longitudinal dimension of the lever. A second lever 58 is pivotably mounted on frame 10 at 59 and is connected at a pivot 93 to the outer end of a plunger 57 of a pneumatic cylinder 94. Cylinder 94 has a first chamber and a second chamber (not shown) connected via respective hoses 95 and 96 to a valve 97 in turn connected to pressure source 88. Valve 97 is operated by an electromagnet 98 in response to control signals from programmer 77.

Lever 55 has a beveled or inclined forward surface 61 for engaging a similarly beveled surface 62 of a frame component 63. This component is fastened to frame 10 by a bolt 64 and is provided with a slot 65 for adjusting the vertical position of component 63 to vary the pressure applied to forward web end 14 by clamping bar 29.

Upon the actuation of microswitch 80 by leading edge 14a, valve 97 is controlled by programmer 77 via electromagnet 98 to connect the first chamber of cylinder 94 to pressure source 88. The consequent pressurization of the first cylinder chamber causes plunger 57 to rotate lever 58 clockwise about pivot 59.

Lever 55 is provided with a recess 67 traversed by a lug 66 projecting laterally from platform 21 (see FIG. 12), while lever 58 is formed with a finger or hook projection 99 also extending into recess 67. Upon the rotation of lever 58 by plunger 57, hook 99 engages a surface 100 of lever 55 in part defining recess 67. Hook 99 acts upon lever 55 to shift the same in the direction of an arrow 60 (FIG. 13) in opposition to the force exerted by restoring spring 56. Prior to the termination of the retraction stroke of plunger 57 beveled surface 61 engages surface 62, thereby causing lever 55 to pivot and clamping bar 29 to shift upwardly to contact clamping surface 31.

Upon the completion of the web-bonding phase, i.e. upon the formation of web weld 23, plate 21 shifts in the direction opposite to that indicated by arrow 60, and lug 66 engages a surface 101 of lever 55 facing surface 100 across recess 67. Substantially simultaneously with the engagement of lug 66 and surface 101, programmer 77 energizes electromagnet 98 to shift valve 97 from the position illustrated in FIG. 14 to the clamp-actuating position, thereby inducing the pressurization of the second chamber of cylinder 94 and the consequent extension of plunger 57. Lug 66 and spring 56 act together to restore lever 55 to the inactive or rest position shown in FIG. 13.

It is to be noted that although press bar 30 is preferably spring-loaded and the opposing press element, namely platform 21, is preferably stationary, it is also possible to have bar 30 fixed to drum 35 and platform 21 spring-loaded and shiftably mounted on frame 10 for reciprocation in a direction perpendicular to rotation axis 32. Moreover, clamping surface 31 need not be strictly planar. It could, for example, be concave towards drum 35.

Although motion of carrier 27 and lever 58 is preferably effectuated by means of pneumatic cylinders, the control may be implemented alternatively by electromagnets or hydraulic cylinders.

I claim:

1. An apparatus for girding a package with a bonded synthetic-resin web, comprising:

a frame;

support means on said frame for holding said package at a bonding station;

feed means on said frame for automatically encircling said package at said station with a leading portion of an elongate synthetic-resin web;

clamping means on said frame for temporarily constraining said web upon an encircling of said package by said leading portion;

cutting means on said frame at said station for severing said leading portion upon a securing of said web by said clamping means, thereby forming a web segment having a leading end and a trailing end overlappable therewith and engaging said package along at least a substantial part of a perimeter thereof, said clamping means functioning to secure at least one of said ends;

melting means on said frame at said station insertable between said ends for heating at least one of said ends on a surface facing the other end;

sealing means on said frame at said station for pressing said ends together along a clamping surface upon a heating of at least one of said ends by said melting means, said sealing means including a drum rotatably mounted on said frame, means to undirectionally rotate said drum on said frame about an axis parallel to said clamping surface, a first press element mounted on said drum, said sealing means further including a second press element disposed in the rotation path of said first press element for coacting therewith to squeeze said ends together during a bonding phase of an operating cycle, said first press element being provided with means shiftably mounting it for moving away from the other press element during said bonding phase upon contact of said elements, said sealing means further including contact-ensuring means acting on at least the shiftably mounted press element for exerting a restoring force thereon to yieldably urge such element towards the other press element during said bonding phase; and a programmer means operatively connected to said feed means, said clamping means, said cutting means, said melting means and said sealing means for controlling and timing the operations thereof, said clamping surface being a plane defined by a face of said second press element, said second press element being mounted on said frame at a fixed distance from said axis, said contact-ensuring means comprising a restoring spring acting on said first press element, said first press element being shiftably mounted for reciprocation perpendicular to said axis, said first press element being in the form of a bar shiftably mounted along a diameter of said drum, said drum having a passage wall for said web along a longitudinal plane parallel to said axis and at an angle with respect to said bar; said cutting means including a blade attached to said drum on said passage wall, passage ahead of said first press element in the direction of rotation of said drum and traversed by said web formed between said first press bar and said blade.

2. The apparatus defined in claim 1 wherein said programmer means includes a drive shaft substantially coaxial with said axis and connected to said drum for rotating same.

3. The apparatus defined in claim 1 wherein said drum is truncated along said longitudinal plane parallel to said axis and at an angle with respect to said bar, said blade being attached to said drum at said longitudinal plane, said passage being a channel extending substantially parallel to said bar for guiding said web during a web-feed phase of said operating cycle and for guiding said trailing end during at least part of said bonding phase.

4. The apparatus defined in claim 3 wherein said channel is wedge-shaped and defined in part by said blade, said blade having a cutting edge disposed on a side of said channel substantially opposite said bar.

5. The apparatus defined in claim 4 wherein said bar radially projects a predetermined distance from said drum to ensure a gripping of said trailing end between said bar and said clamping surface prior to the severing of said leading portion by said cutting means.

6. The apparatus defined in claim 5 wherein the distance between said cutting edge and an outer end of said bar is substantially equal to the length of a chord defined by intersections of said clamping surface with a rotation path of said outer end.

7. The apparatus defined in claim 6 wherein said cutting means includes a stationary edge coacting with said blade in severing said leading portion, further comprising a guide surface juxtaposed to said stationary edge for forcing said bar radialy inwardly during a passing thereby of said stationary edge.

8. The apparatus defined in claim 5 wherein said melting means includes a heating mandrel of small diameter movably mounted on said frame for entering under the control of said programmer means a wedge-shaped space between said leading end and said trailing end upon the severing of said leading portion by said cutting means, said trailing end slipping between said mandrel and said bar and said mandrel being pushed towards a rest position by said bar during said bonding phase.

9. The apparatus defined in claim 8 wherein said mandrel extends parallel to said clamping surface and is pivotably mounted on said frame for swinging about an additional axis perpendicular to said clamping surface.

10. The apparatus defined in claim 9 wherein said additional axis is in the region of said support means.

11. The apparatus defined in claim 8 wherein said support means includes a platform shiftably mounted on said frame for removing said package from said station upon the completion of said operating cycle, said clamping surface being formed on an underside of said platform.

12. The apparatus defined in claim 11 wherein said platform, said clamping means and said mandrel are operatively connected to said drive shaft during at least part of said operating cycle, said drive shaft being provided with camming means for at least partially controlling the motions of said platform, said clamping means and said mandrel.

13. The apparatus defined in claim 12 wherein said operating cycle corresponds to a revolution of said drive shaft.

14. The apparatus defined in claim 1 wherein said perimeter defines an additional plane, said clamping surface extending substantially perpendicular to said additional plane, said bar rotating substantially in said additional plane.

* * * * *